(12) United States Patent
Olson et al.

(10) Patent No.: US 7,605,717 B2
(45) Date of Patent: Oct. 20, 2009

(54) AMR TRANSMITTER WITH PROGRAMMABLE OPERATING MODE PARAMETERS

(75) Inventors: John A. Olson, Brookfield, WI (US); Mark Lazar, New Berlin, WI (US); Syed Mateen, Lindenhurst, IL (US); Kelly Laughlin-Parker, Waukesha, WI (US)

(73) Assignee: Badger Meter, Inc., Milwaukee, WI (US)

( * ) Notice: Subject to any disclaimer, the term of this patent is extended or adjusted under 35 U.S.C. 154(b) by 444 days.

(21) Appl. No.: 11/500,865

(22) Filed: Aug. 8, 2006

(65) Prior Publication Data

US 2008/0062005 A1 Mar. 13, 2008

(51) Int. Cl.
*G08C 15/06* (2006.01)

(52) U.S. Cl. .............. 340/870.02; 340/870.03; 340/870.11

(58) Field of Classification Search .......... 340/870.02, 340/870.11, 870.17
See application file for complete search history.

(56) References Cited

U.S. PATENT DOCUMENTS

| 4,940,976 | A | | 7/1990 | Gastouniotis |
| 5,298,894 | A | | 3/1994 | Cerny et al. |
| 5,617,084 | A | * | 4/1997 | Sears ............... 340/870.02 |
| 6,798,352 | B2 | | 9/2004 | Holowick |
| 2006/0103547 | A1 | * | 5/2006 | Salser et al. ........ 340/870.02 |
| 2007/0057812 | A1 | * | 3/2007 | Cornwall .......... 340/870.02 |

* cited by examiner

*Primary Examiner*—Timothy Edwards, Jr.
(74) *Attorney, Agent, or Firm*—Boyle Fredrickson, S.C.

(57) ABSTRACT

The invention provides a method and circuitry for programming an AMR transmitter to operate in different modes. The device can be programmed as to any one or all of the following parameters: transmission power according to the physical environment of the installation; power level and modulation type for drive-by or fixed network application; and frequency of data transmission to conserve battery life. A laptop computer or other type of programming device communicates through an optical IR port to enter these parameters.

15 Claims, 2 Drawing Sheets

AMR TRANSMITTER WITH PROGRAMMABLE OPERATING MODE PARAMETERS

TECHNICAL FIELD

This invention relates to automatic meter reading (AMR) systems, and in particular to utility meters using a radio transmitter for transmitting metering data signals to a radio receiver in a network for collecting utility metering data.

DESCRIPTION OF THE BACKGROUND ART

Cerny et al., U.S. Pat. No. 5,298,894, discloses a mobile automatic meter reading (AMR) system in which a utility meter transmitter receives pulses from a pulse transducer installed on a utility meter and transmits radio frequency (RF) meter data signals to an RF collection unit in a drive-by vehicle. In these mobile AMR systems, a vehicle or a person on foot with an RF collection unit (a walk-by collection system) can move through a neighborhood and collect a large number of readings per hour without entering any of the property of the customers.

Gastouniotis et al., U.S. Pat. No. 4,940,976, discloses a communications network for transmitting data from a plurality of remote meters to a central station through a plurality of fixed receiving stations. In fixed receiver network systems today, the receiver units can be mounted on utility poles, inside of electric meters or in utility pedestals. In such systems, it is not necessary to provide people and equipment to travel through the areas where readings are to be collected. There are, however, other issues is locating receivers and providing other equipment, such as repeaters, to provide coverage of the entire geographic area being serviced.

Mobile collection units and their associated transmitters operate in the unlicensed band around 915 Mhz, where transmissions are only required to reach distances of a few hundred feet, but must be sent out frequently to be available for a drive-by or walk-by collection unit at random times of collection. The unlicensed band is in a narrow range of the radio frequency spectrum, where power associated with the transmission signals is limited, to prevent interference in various areas where the equipment is operating with other RF signals in the environment. Fixed networks, on the other hand, transmit signals over distances of up to 1,000 feet, with a goal to reach distances of one-half mile or more. Fixed network transmitters typically utilize a frequency-hopping, spread-spectrum type of transmission, which by regulation is permitted to use transmitter power levels 1000 times greater than the narrow band systems.

Mobile data collection systems and fixed data collection systems are competing in the marketplace today as gas, electric and water utilities move toward automation in the collection of metering data and the billing of utility customers.

Many utilities purchasing automatic meter reading systems today must consider system issues over a period of years. It would therefore be beneficial to the acceptance of such systems to provide these customers with the maximum long term system capabilities at a minimum reasonable cost including the costs associated with the installation, servicing and upgrading of the transmitters over the life of the system as a whole.

SUMMARY OF THE INVENTION

The invention provides a method and circuitry for programming an AMR transmitter to operate in different modes. The device can be programmed as to any one or all of the following parameters: a) transmission power according to the physical environment of the installation; b) power level and modulation type for drive-by or fixed network application; and c) frequency of data transmission to conserve battery life.

It is convenient to enter all of these parameters upon initial configuration at a factory and also when programmed at a customer site.

The invention also relates to transmitter circuitry for carrying out the method of the invention.

In a further aspect of the invention, the transmitter circuitry further comprises a CPU operating according a stored control program; and a radio frequency modulation section for modulating meter data signals into radio signals for transmission.

The method and circuitry is very versatile in serving different types of networks, thereby saving utility customers costs in the event they may utilize more than one type of AMR system over the life of the transmitter.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
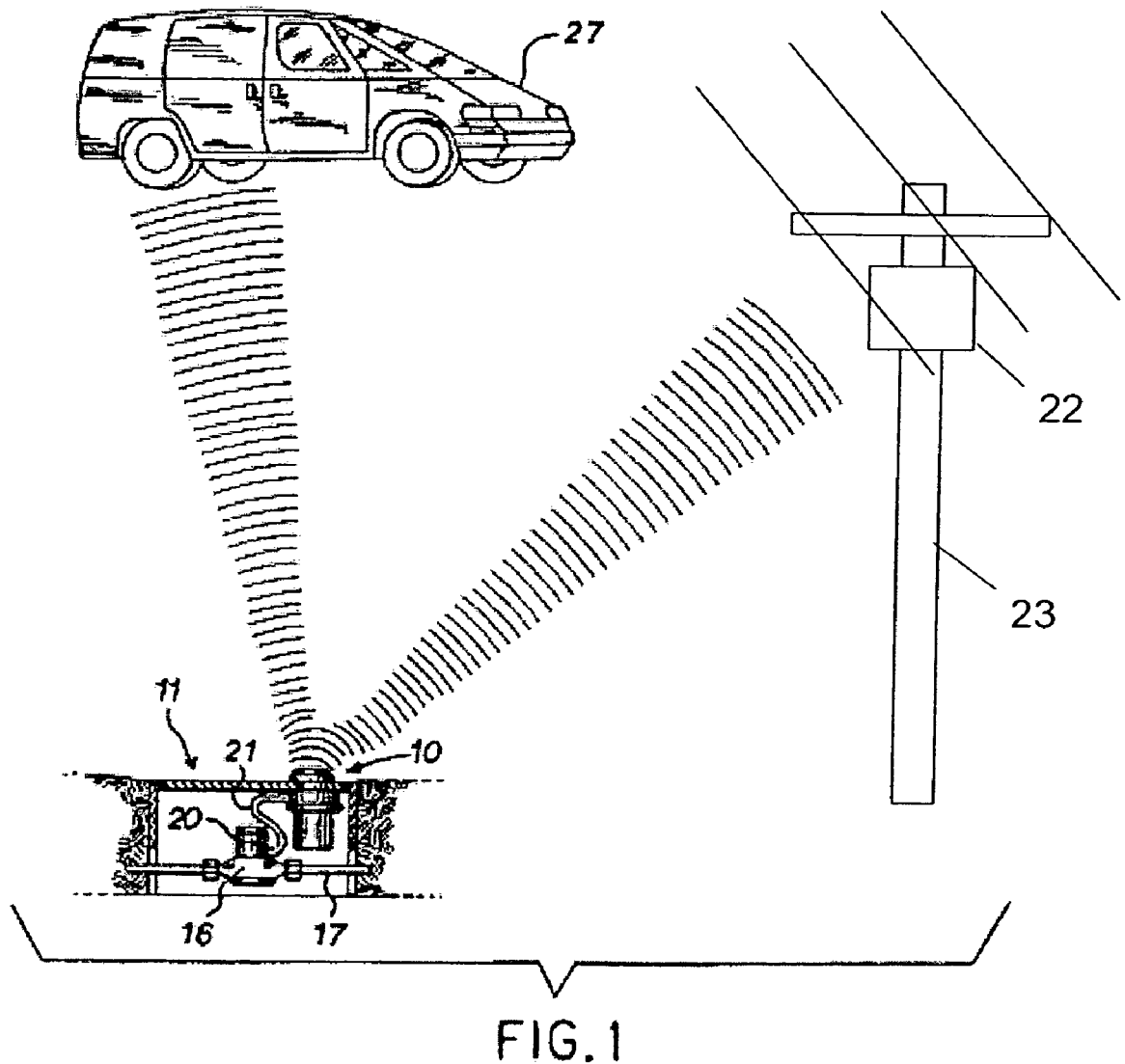
FIG. 1 is a perspective view of an AMR system with both mobile and fixed receivers for receiving transmissions from a transmitter associated with a utility meter.

Referring to FIG. 1, one example of an environment of the invention is provided by a subsurface pit enclosure 11. The pit is made of metal, concrete, plastic or other materials and a lid which is removable to open the enclosure 11 for access. The pit enclosure 11 is located along the route of water supply pipe 17. A water meter housing 16 is connected in the water supply line 17. A water meter register unit 20 is mounted on top of the water meter housing 16. As known in the art, meter registers convert mechanical movements of a meter to visual and numerical representations of consumption often shown in an odometer type read-out device. The register 20 is preferably a unit that is commercially distributed by Badger Meter, Inc., the assignee of the present invention, under the trade designation "Recordall" Transmitter Register (RTR). Besides displaying units of consumption, this device 20 uses a pulse transmitter that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art an using optics and an analog-to-digital encoder (ADE) circuit can also be used as the register 20.

The register 20 connects via a shielded cable 21 to a transmitter assembly 10, which is housed in a tubular housing of plastic material that hangs down from the pit lid. The register 20 transmits electrical signals to the transmitter assembly 10, for further transmission through a radio network. Besides the cable 21, it is also known in the art to transmit these signals wirelessly to an antenna mounted in the pit lid as well.

The transmitter assembly 10 communicates via low power RF signals with a receiver which can be a mobile receiver (not shown) in a vehicle 27. The pit transmitter assembly 10 transmits an electronic message that includes an identification code, meter reading data, alarm data and an error code for checking the data at the receiving end. The meter data is collected from various customer locations for billing purposes.

In the present invention, the transmitter assembly 10 can also communicate via higher power RF signals with a fixed receiver 22 installed on a utility pole 23 within a range of one thousand feet of the transmitter unit 10. The pit transmitter assembly 10 transmits an electronic message that includes an identification code, meter reading data, alarm data and an error code for checking the data at the receiving end. The meter data is collected from various customer locations for billing purposes.

Figure 2:
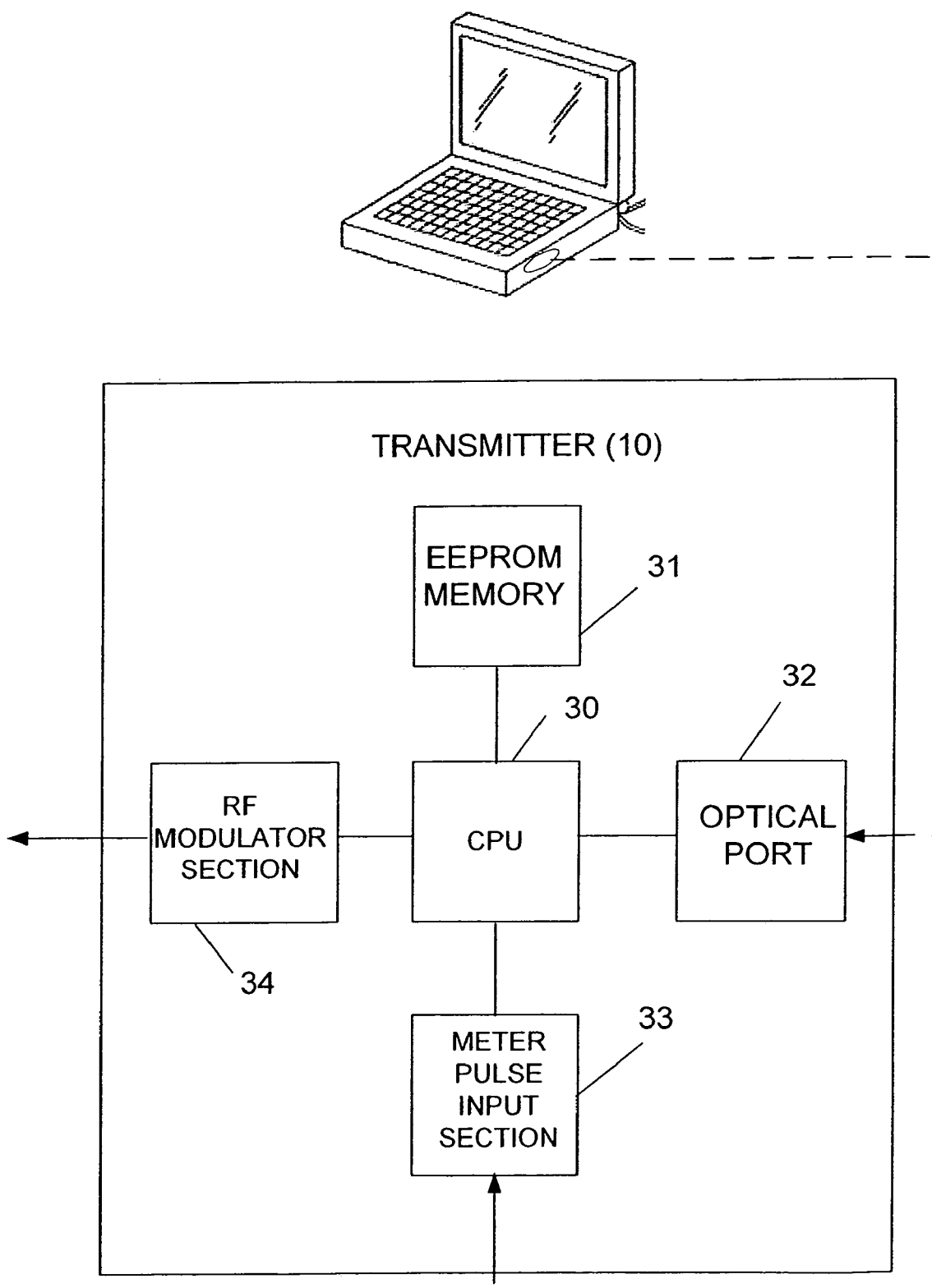
FIG. 2 is a block diagram of a metering data transmitter associated with a utility meter and a programming unit for programming the modes of operation of the transmitter.

Referring to FIG. 2, the transmitter assembly 10 also includes an electrical circuit typically formed on a circuit board and including a microelectronic CPU 30 operating according to a control program.

As further seen in FIG. 2, the CPU 30 receives pulses from a pulse encoder of the type described above through a meter pulse input section 33. This input section can receive a pulse input or an input from an odometer position encoder circuit of a type known in the art. It then transmits metering data in a message protocol, which is converted to radio frequency (RF) signals by an RF modulator section 34.

The AMR transmitter 10 has two modes of operation and operates on a one-way AMR network. In a one-way AMR network, with narrowband receivers, the transmitter 10 will transmit in the narrow band mode of operation most of the time. In this mode, the transmitter will normally be in a sleep mode from which it will periodically wake-up and send a message on a single carrier frequency within the 902-928 Mhz frequency band and in accordance with FCC regulations. This is a one-way network in which the transmitter initiates communication with the receiver. The power level of the transmission is limited by FCC regulations. At a transmission distance of three meters through a 50-ohm load, this is considered to be a transmission power level limit of approximately one (1) milliwatt. Drive-by vehicles 27 will be able to read the transmitter signal and collect meter readings. This type of system uses a battery for power and this mode of transmission provides long battery life using small batteries. This signal may be read by fixed receivers 22 provided they are not too far from the transmitter. However, due to the need to cover geographic areas, the receivers 22 may be further away than the optimum range for narrow band operation and may require transmission at a higher power level.

Therefore, it would be desirable to provide a second transmitter or a second type of transmission for fixed network systems utilizing a higher power level. This power level is limited to ¼ watt for a number of channels from 25 to 50 channels and to one (1) watt for systems utilizing at least 50 channels. This transmission can be made at longer intervals than the narrow band transmissions which must be available to a mobile, drive-by receiver or a walk-by receiver at random times. The fixed receiver is always present, so a frequency of transmission on the order of an hour or longer is acceptable. After the higher power transmission, the transmitter 10 returns to narrow band operation transmitting lower power pulses at 4-second intervals.

Also seen in FIG. 2 is an RF modulation section 34, which is controlled by the CPU 30 to control the power level of the transmission and the type of modulation (narrowband, DTS, frequency hopping). Preferably this section is provided by a CC1150 CPU available from Texas Instruments. Because the CPU 30 can change the parameters of the RF section 34, the type of transmission can be changed to optimize the signal type for a particular application such as drive-by or fixed networks. The standard RF message consists of a utility consumption or other meter reading data, a device serial number and status information. The RF section 34 also has a parameter for the level of power transmission based on the physical environment of the transmitters, such as being located in a metal enclosure, or one of concrete or plastic. The physical environment creates different RF attenuation. The ability to program the power levels at the RF chip allow the same device to transmit at the FCC power limit for the specific environment.

Also seen in FIG. 2 is an optical port 32 for receiving and transmitting signals wirelessly in an IR band. A laptop computer 40 having an IR port 41 and running a Windows operating system with appropriate application software available from the assignee of the present application can read data through the IR port 32. The present invention adds the enhancement of enabling the laptop to program the transmitter 10 as to the following parameters: a) output power according to the physical environment of the installation; b) power level and modulation type for drive-by or fixed network application; and c) a frequency of data transmission to conserve battery life. This can be done in the factory of manufacture, including assembly, or at a customer site in the field in a single programming communication sequence. Although a laptop 40 is illustrated for a preferred embodiment, the invention also contemplates personal digital assistants (PDAs) and other types of computerized programming devices in alternative embodiments.

The transmitter circuit may optionally include a EEPROM memory 31 for storing meter reading data. This data can be uploaded to the laptop computer 40 through the optical port 32.

One advantage of the invention, is that it requires only a single transmitter and provides several modes of operation with common circuitry.

Another advantage of the invention is that it conserves battery life.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A method for programming the operating mode of a utility meter transmitter unit for use in an automatic meter reading network, the utility meter interface unit comprising:
   storing operating parameters in a utility metering transmitter unit for determining the following functions:
   transmission power of the transmitter unit according to a physical environment of an installation of the transmitter unit, wherein the physical environment comprises a type of enclosure in which the transmitter unit is situated;
   a selection of one of two significantly different power levels differing by at least an order of magnitude and a selection of one of at least two modulation types for communicating with a drive-by receiver and a fixed network receiver, respectively; and
   frequency of occurrence of data transmissions over a predefined interval to conserve battery life; and
   transmitting one or more of said operating parameters into the utility meter transmitting unit using a programming unit.

2. The method as recited in claim 1, wherein all of said operating parameters for said functions are transmitted into the utility transmitting unit in one programming communication sequence.

3. The method as recited in claim 1, wherein said operating parameters for said functions are transmitted into the utility transmitting unit through an infrared (IR) optical interface.

4. The method as recited in claim 1, wherein said operating parameters for said functions are transmitted into the utility transmitting unit at a factory of manufacture.

5. The method as recited in claim 1, wherein said operating parameters for said functions are transmitted into the utility transmitting unit after being installed at a customer site.

6. The method as recited in claim 1, wherein said operating parameters for said functions are transmitted into the utility transmitting unit using a laptop computer as the programming unit.

7. A utility meter interface unit for use in an automatic meter reading network, the utility meter interface unit comprising:
   a circuit for storing operating parameters for determining the following functions:
   transmission power of a transmitter unit in the utility meter interface unit according to a physical environment of an installation of the transmitter unit, wherein the physical environment comprises a type of enclosure in which the transmitter unit is situated;
   a selection of one of two different power levels differing by at least an order of magnitude and a selection of one of at least two modulation types for communication with a drive-by receiver and a fixed network receiver, respectively; and
   frequency of occurrence of data transmissions over a predefined interval to conserve battery life; and
   wherein said circuit is capable of receiving said operating parameters from an external programming unit.

8. The utility meter interface unit as recited in claim 7, wherein all of said operation parameters for said functions are transmitted into the utility transmitting unit in one programming communication sequence.

9. The utility meter interface unit as recited in claim 7, further comprising:
   a CPU operating according a stored control program; and
   wherein the circuit is a radio frequency modulation section for modulating meter data signals into RF signals for transmission.

10. The utility meter interface unit recited in claim 9, wherein a first one of the two modulation types includes narrow frequency band signals and wherein a second one of the two modulation types includes frequency hopping spread spectrum signals that are transmitted by the radio frequency modulation section according to one of the stored parameters.

11. The utility meter interface unit as recited in claim 9, further comprising an optical port and wherein said operation parameters for said functions are transmitted into the utility transmitting unit through said optical port.

12. The utility meter interface unit as recited in claim 9, in combination with a laptop computer as the programming unit including a computer program wherein said operation parameters for said functions are transmitted into the utility meter interface unit.

13. The method as recited in claim 1, wherein a first one of the two modulation types includes narrow frequency band signals and wherein a second one of the two modulation types includes frequency hopping spread spectrum signals that are transmitted by a radio frequency modulation section according to one of the stored parameters.

14. The method as recited in claim 1, wherein the enclosure is at least one of a metal enclosure, a concrete enclosure and a plastic enclosure.

15. The utility meter interface unit as recited in claim 7, wherein the enclosure is at least one of a metal enclosure, a concrete enclosure and a plastic enclosure.

* * * * *